(12) United States Patent
Suzuki et al.

(10) Patent No.: US 7,801,673 B2
(45) Date of Patent: Sep. 21, 2010

(54) MOTORCYCLE NAVIGATION DEVICE

(75) Inventors: Koji Suzuki, Wako (JP); Hiroyuki Morita, Wako (JP); Hidemi Minami, Wako (JP); Tsuguhito Ichiriki, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 506 days.

(21) Appl. No.: 11/234,128

(22) Filed: Sep. 26, 2005

(65) Prior Publication Data

US 2006/0069499 A1 Mar. 30, 2006

(30) Foreign Application Priority Data

Sep. 30, 2004 (JP) ............................. 2004-289330

(51) Int. Cl.
G01C 21/00 (2006.01)
(52) U.S. Cl. ...................................... 701/200; 701/212
(58) Field of Classification Search .................. None
See application file for complete search history.

(56) References Cited

U.S. PATENT DOCUMENTS

| | | | | |
|---|---|---|---|---|
| 4,473,251 A | * | 9/1984 | Murayama | 296/78.1 |
| 4,565,909 A | * | 1/1986 | Yashima et al. | 200/61.85 |
| 4,600,208 A | * | 7/1986 | Morishima | 280/288.4 |
| 4,792,783 A | * | 12/1988 | Burgess et al. | 307/10.1 |
| 4,915,187 A | * | 4/1990 | Nakashima et al. | 180/219 |
| 5,222,752 A | * | 6/1993 | Hewitt | 280/288.4 |
| 6,157,890 A | * | 12/2000 | Nakai et al. | 701/200 |
| 6,225,584 B1 | * | 5/2001 | Ase et al. | 200/61.54 |
| 6,249,744 B1 | * | 6/2001 | Morita | 701/213 |
| 6,373,472 B1 | * | 4/2002 | Palalau et al. | 345/173 |
| 6,418,362 B1 | * | 7/2002 | St. Pierre et al. | 701/36 |
| 6,502,884 B2 | * | 1/2003 | Shimazaki et al. | 296/37.1 |
| 6,819,990 B2 | * | 11/2004 | Ichinose | 701/36 |
| 2002/0040272 A1 | * | 4/2002 | Nagasaka et al. | 701/211 |
| 2002/0085043 A1 | * | 7/2002 | Ribak | 345/810 |
| 2002/0160723 A1 | * | 10/2002 | Yagi | 455/90 |
| 2002/0167191 A1 | * | 11/2002 | Tsukui et al. | 296/78.1 |

(Continued)

FOREIGN PATENT DOCUMENTS

JP 2001-151015 A 6/2001

(Continued)

OTHER PUBLICATIONS

Patent Abstracts of Japan, JP-A-09-095276, Takahashi Hiroyuki, Apr. 8, 1997.

*Primary Examiner*—Michael J. Zanelli
(74) *Attorney, Agent, or Firm*—Birch, Stewart, Kolasch & Birch, LLP

(57) ABSTRACT

A navigation device for a motorcycle operable in a comfortable position during driving by solving a problem that it is hard to operate the navigation device during driving and easily mounted on a vehicle by solving the problem that it is hard to mount the navigation device on the vehicle. The navigation device includes a navigation display section for displaying navigation information such as a destination and the current vehicle position, a control unit for controlling the navigation display section, and an operating section for performing an input operation to the control unit. The operating section is separated from the navigation display section and the operating section is disposed on the side of a vehicle body.

25 Claims, 13 Drawing Sheets

U.S. PATENT DOCUMENTS

| | | | |
|---|---|---|---|
| 2003/0036360 A1* | 2/2003 | Russell et al. | 455/66 |
| 2004/0117084 A1* | 6/2004 | Mercier et al. | 701/36 |
| 2004/0176906 A1* | 9/2004 | Matsubara et al. | 701/200 |
| 2005/0267674 A1* | 12/2005 | Suzuki et al. | 701/200 |
| 2006/0059294 A1* | 3/2006 | Smith et al. | 710/313 |

FOREIGN PATENT DOCUMENTS

| | | |
|---|---|---|
| JP | 2001-280982 A | 10/2001 |
| JP | 2002-19670 A | 1/2002 |

* cited by examiner

MOTORCYCLE NAVIGATION DEVICE

CROSS-REFERENCE TO RELATED APPLICATION

The present application claims priority under 35 U.S.C. §119 to Japanese Patent Application No. 2004-289330, filed Sep. 30, 2004, the entire contents of which are hereby incorporated by reference.

BACKGROUND OF THE INVENTION

1. Field of the Invention

The present invention relates to an improvement of a motorcycle navigation device capable of displaying a destination, the current vehicle position or the like.

2. Related Background Art

There is a navigation device mounted on an instrument panel applied to practical use as a motorcycle navigation device.

The practical motorcycle navigation device has been sufficient for practical applications only if it is mounted within a driver's visible range.

There is a known motorcycle navigation device in which a monitor screen (a navigation display section) and operating switches (an operating section) are housed integrally and mounted on an instrument panel (for example, refer to Japanese Patent Laid-Open No. Hei 9-95276 (pp. 5 and 6, FIGS. 5 and 6).

Referring to FIG. 15, there is shown a diagram for explaining the arrangement of a conventional motorcycle navigation device, showing a motorcycle 320 with handlebars 322 attached to a vehicle body 321 so as to be free to steer, a wind screen 323 provided in front of the handlebars 322, and a navigation device 325 disposed in the center of the portion behind the handlebars 322.

Referring to FIG. 16, there is shown a diagram for explaining a basic configuration of the conventional motorcycle navigation device, showing the motorcycle navigation device 325 with a monitor screen (a navigation display section) 327 provided in a housing 326, operating switches (an operating section) 328 provided in the housing 326, and a cover 329 attached to the housing 326 so as to be free to open or close in order to cover the monitor screen 327 and the operating switches 328.

The motorcycle navigation device 325 is disposed in the center of the portion behind the handlebars 322 as shown in FIG. 15 and is operated using the operating switches 328 in the housing 326. When the driver operates the navigation device 325 during driving, however, the convenience would be enhanced if the driver could operate it without changing the driving position.

Furthermore, in the motorcycle navigation device 325, the monitor screen 327 and the operating switches 328 are placed integrally in the housing 326 as shown in FIG. 16, which leads to an increase in size of the navigation device 325 and has caused such a problem that it is difficult to mount the navigation device 325 onto the vehicle body 321.

Thus, it is desired to provide a motorcycle navigation device that can be operated in a comfortable position during driving and that can be easily mounted on the motorcycle.

SUMMARY OF THE INVENTION

It is an object of the present invention to provide a motorcycle navigation device that has improved operability during driving and is operable in a comfortable position even if the motorcycle is moving. Another object is to provide a motorcycle navigation device capable of increasing flexibility in mounting the navigation device onto the vehicle.

According to a first aspect of the present invention, there is provided a motorcycle navigation device comprising a navigation display section for displaying navigation information such as a destination and the current vehicle position, a control unit for controlling the navigation display section, and an operating section for performing an input operation to the control unit, wherein the operating section is separated from the navigation display section and the operating section is disposed on the side of a vehicle body in a motorcycle provided with the navigation device. This improves flexibility in the arrangement and can contribute to improved operability.

Preferably, the operating section is divided into a first operating section operable during driving and a second operating section operated during parking and the operating section further includes specific input means capable of input to the control unit besides the first and second operating sections.

With the operations divided into those performed during driving and those performed during parking by dividing the operating section into the first operating section operable during driving and the second operating section operated during parking, a driver can be provided with an ease of use.

In addition, with the operating section provided with the specific input means capable of input to the control unit, the navigation device can be widely used and be improved in convenience.

Preferably, the specific input means is voice input means capable of input in voice and the first operating section is provided with a changeover switch for changing over to the voice input enabled condition.

With the use of the voice input means capable of input in voice as the specific input means, the navigation device can be used without taking either hand off a handlebar even if the motorcycle is moving, for example.

In addition, with the provision of the changeover switch for changing over to the voice input enabled condition in the first operating section, the input mode can be changed to the voice input even if the motorcycle is moving.

Preferably, the first operating section is provided with one or both of a zooming switch for zooming in or out a map screen displayed on the navigation display section and a voice re-guide switch for prompting a repetition of a voice guide.

With the provision of the zooming switch for zooming in or out the map screen displayed on the navigation display section in the first operating section, the map screen can be zoomed in or out during driving. With the provision of the voice re-guide switch for prompting the repetition of the voice guide in the first operating section, the driver can listen to the voice of the voice guide any number of times if he failed to catch it during driving.

Preferably, the first operating section is provided with a screen changeover switch for changing a guide screen for displaying the map screen and various kinds of guide information.

With the provision of the screen changeover switch for changing the guide screen for displaying the map screen and various kinds of guide information in the first operating section, it becomes possible to change the guide screen for displaying the map screen and various kinds of guide information during driving.

Preferably, the first operating section is disposed in the vicinity of the left handle grip.

With the first operating section disposed in the vicinity of the left handle grip, it is possible to operate the navigation device without taking either hand off the handlebar during driving.

Preferably, the second operating section is disposed under the right handle grip and inside a cowl for covering the vehicle body.

With the provision of the second operating section disposed under the right handle grip and inside the cowl for covering the vehicle body, it is possible to make various settings for the navigation device while sitting astride a vehicle seat during parking.

Preferably, the first operating section is disposed under a handle switch.

With the disposition of the first operating section under the handle switch, it does not hinder the switch operation required during driving.

As stated above, the operating section is separated from the navigation display section, whereby the navigation device can be easily mounted. Hereby, there is an advantage of encouraging broad use of the navigation device.

In addition, the operating section is disposed on the side of the vehicle body, whereby it is possible to operate the navigation device in a comfortable position. Hereby, there is an advantage of making the navigation device user-friendly.

As stated above, the operating section is divided into the first operating section operable during driving and the second operating section operated during parking, whereby operations to be performed during driving can be clearly distinguished from operations to be performed during parking. As a result, there is an advantage of improving the operability of the navigation device.

In addition, the operating section further includes specific input means capable of inputting commands to the control unit, whereby the navigation device can be widely used. As a result, there is an advantage of improving the convenience of the navigation device.

As stated above, the specific input means is the voice input means capable of inputting in voice commands, whereby the navigation device can be used even if the driver cannot take either hand off the handlebar during driving, for example. Hereby, there is an advantage of further improving the convenience of the navigation device.

In addition, the first operating section is provided with the changeover switch for changing over to the voice-input-enabled condition, thereby enabling the changeover to the voice input even if the motorcycle is moving. Hereby, there is an advantage of improving the convenience of the navigation device.

As stated above, the first operating section is provided with the zooming switch for zooming in or out the map screen displayed on the navigation display section, thereby enabling the map screen to be zoomed in or out during driving, and the first operating section is provided with the voice re-guide switch for prompting the repetition of the voice guide, whereby the driver can listen to the voice of the voice guide any number of times if he failed to catch it during driving. As a result, there is an additional advantage of improving the convenience of the navigation device.

As stated above, the first operating section is provided with the screen changeover switch for changing the guide screen for displaying the map screen and various kinds of guide information, thereby enabling the changeover of the guide screen for displaying the map screen and various kinds of guide information during driving. As a result, there is an advantage of improving the convenience of the navigation device.

As stated above, the first operating section is disposed in the vicinity of the left handle grip, whereby the driver can operate the navigation device without taking either hand off the handlebar during driving. Hereby, there is an advantage of improving the convenience of the navigation device.

As stated above, the second operating section is disposed under the right handle grip and inside the cowl for covering the vehicle body, whereby the driver can make various settings for the navigation device while sitting astride the vehicle seat during parking. Hereby, there is an advantage of improving convenience of the navigation device.

The first operating section is disposed under the handle switch, whereby it does not hinder the switch operation required during driving.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
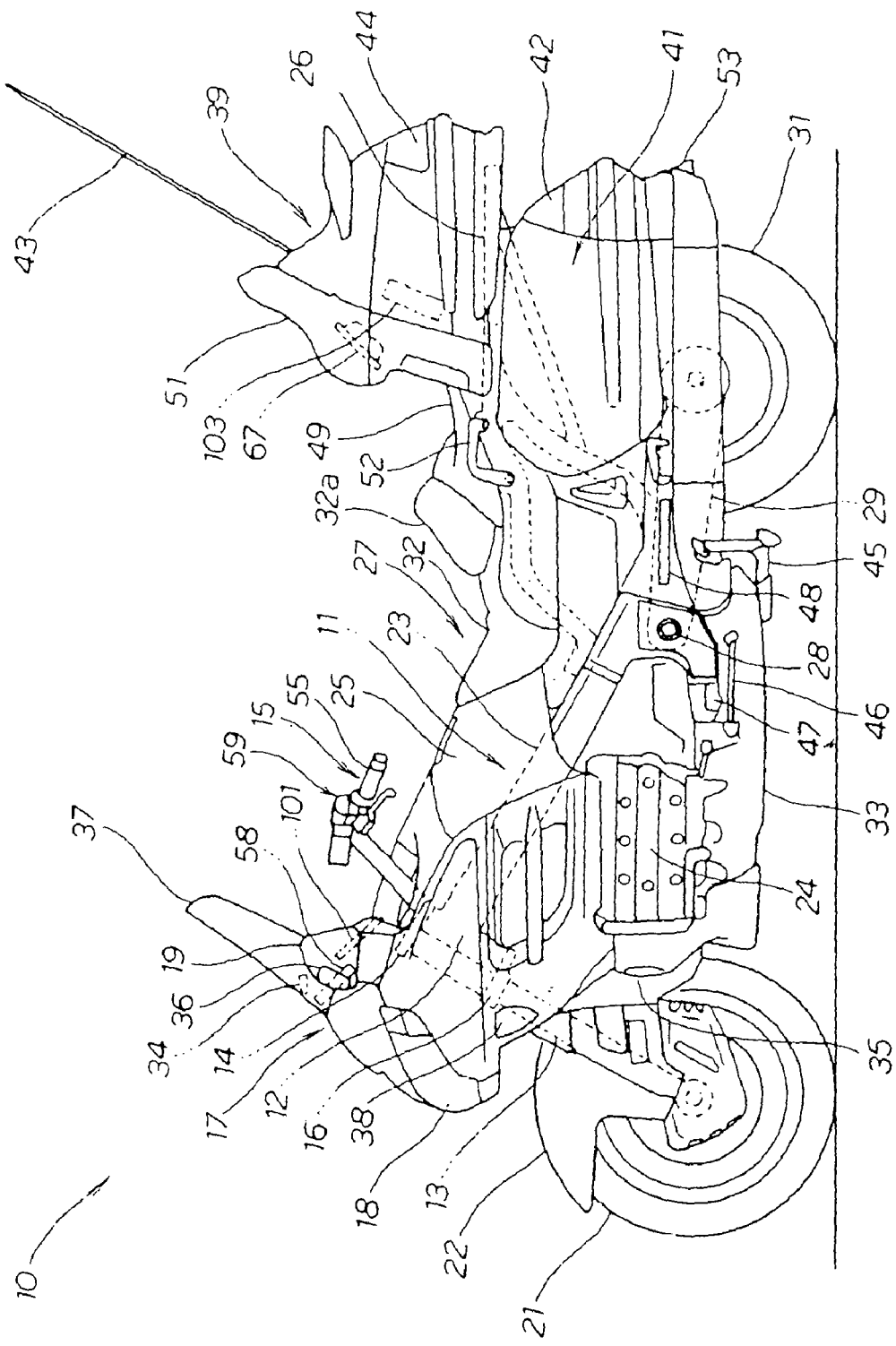
FIG. 1 is a side view of a motorcycle using a navigation device according to the present invention.

The preferred embodiments of the present invention will now be described in detail hereinafter with reference to the accompanying drawings. It is assumed here that the drawings should be viewed in the direction of the reference numerals.

Referring to FIG. 1, there is shown a side view of a motorcycle using a navigation device according to the present invention. The motorcycle 10 comprises a head pipe 12 attached to a vehicle frame (vehicle body) 11, a front fork 13 attached to the head pipe 12 so as to be steerable, a steering handle 15 attached to a top bridge 14 of the front fork 13, a fairing 17 provided in front of the top bridge 14 and a bottom bridge 16, head lights 18, 18 (one headlight 18 is not shown) disposed on the front face of the fairing 17 with right and left mirrors 19, 19 (one mirror 19 is not shown), a front wheel 21 attached to the lower portion of the front fork 13 with the front wheel 21 covered with a front fender 22, a main frame 23 of the vehicle frame 11 extended from the head pipe 12 backward, an engine 24 disposed at the bottom of the main frame 23, a fuel tank 25 disposed in the upper portion of the main frame 23, a seat rail 26 extended from the main frame 23 backward, a vehicle seat 27 attached to the seat rail 26, a rear swing arm 29 extended from the rear bottom of the main frame 23 via a pivot 28, a rear wheel 31 rotatably attached to the rear end of the rear swing arm 29, and a rear cushion (not shown) between the rear of the rear swing arm 29 and the vehicle frame 11.

In this diagram, there are shown an under cover 33, a global positioning system (GPS) antenna 34, a fog lamp 35, a front winker 36, a wind screen 37, an air opening 38 provided in the fairing 17 for supplying an air to the engine 24, a trunk box 39, a saddlebag 41, a rear winker 42, a rod antenna 43, a tail lamp 44, a main stand 45, a sub stand 46, a driver step 47, and a passenger step.

The vehicle seat 27 includes a front seat (a driver seat) 32 which a driver sits on and a back seat (a passenger seat) 49 which a passenger sits on. The front seat 32 has a lumbar cushion 32a for supporting the driver's lumbar and the back seat 49 has a backrest 51 for holding the passenger's back and grab rails 52, 52 (the grab 52 on the other side is not shown) that the passenger grips.

Figure 2:
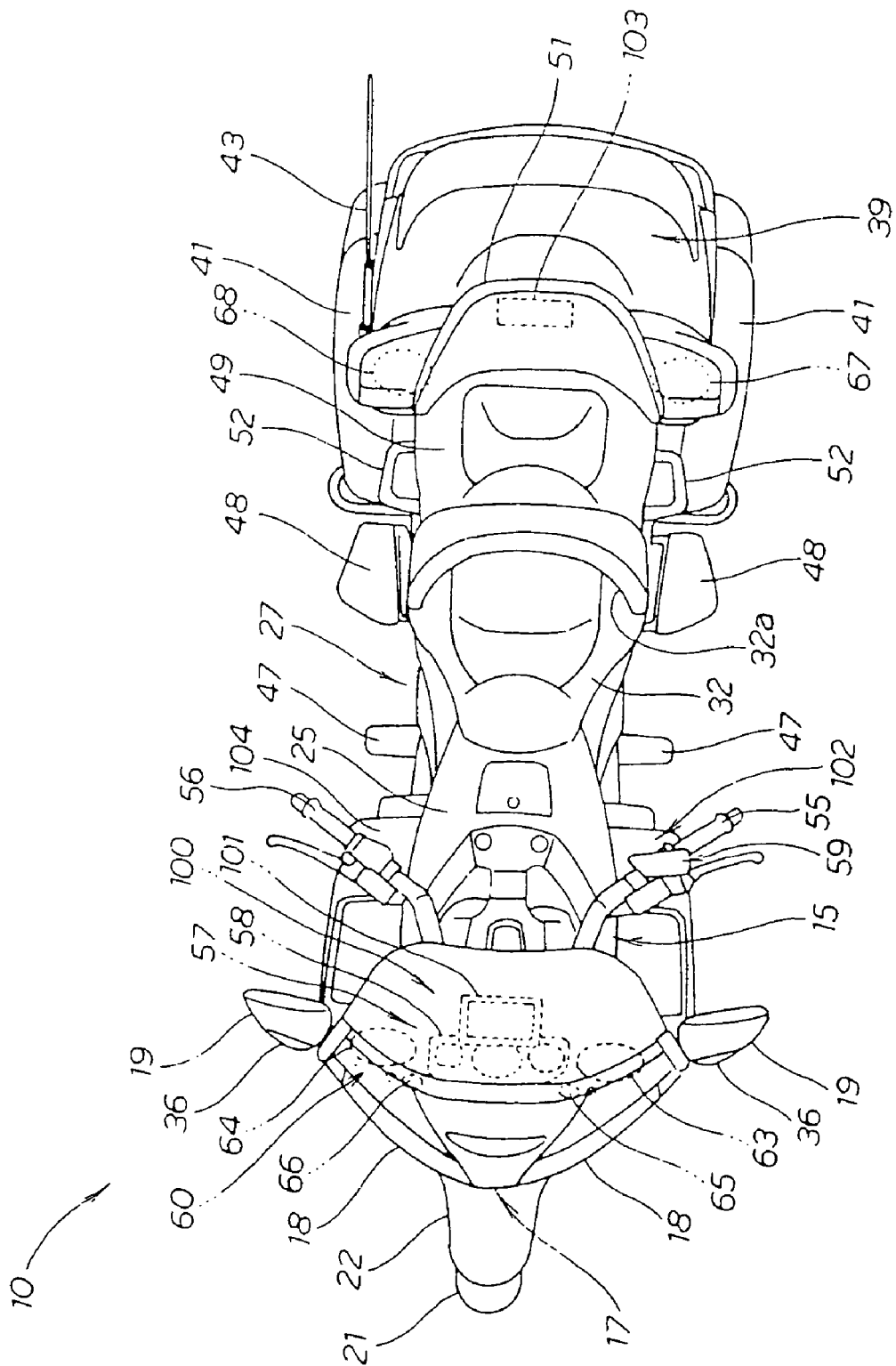
FIG. 2 is a plan view of the motorcycle using the navigation device according to the present invention.

Referring to FIG. 2, there is shown a plan view of the motorcycle using the navigation device according to the present invention. The following provides information on a motorcycle acoustic system 60 (hereinafter, simply referred to as "acoustic system 60") attached to the motorcycle 10.

The acoustic system 60 includes a left midrange/bass unit 63 for reproducing midrange or bass sounds arranged to the left of a meter indicating section (vehicle meter) 58, a left treble unit 65 for reproducing treble sounds arranged between the meter indicating section 58 and the left midrange/bass unit 63, a right treble unit 66 for reproducing treble sounds arranged between the meter indicating section 58 and a right midrange/bass unit 64, left and right deep bass units (deep bass speakers) 67, 68 capable of reproducing the lower reaches of the frequency spectrum than the left and right midrange/bass units 63, 64 attached in the trunk box 39, and a component 69 for causing these units 63 to 68 to generate reproduced sounds.

The component 69 is audio equipment having the functions of a tuner, a compact disc (CD) deck, a mini disc (MD) deck, a cassette deck, an amplifier and the like.

The motorcycle navigation device 100 (hereinafter, simply referred to as "navigation device 100") according to the present invention comprises a navigation display section 10.1 arranged at the rear of the meter indicating section 58, an operating section 102 having a divided construction arranged around a steering handle 15 and a cowl (upper panel) 104, and a control unit 103 housed in the trunk box 39, which are described in detail with reference to FIG. 7 to FIG. 14. Reference numerals 55 and 56 designate left and right handle grips, respectively, and a reference numeral 59 designates a handle switch box containing switches and the like to be operated during driving with the handle switch box arranged to the left of the steering handle 15.

Figure 3:
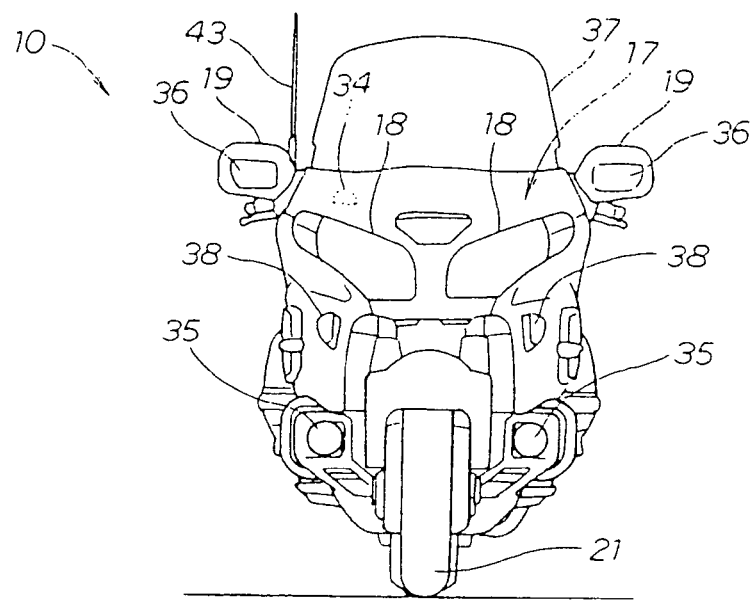
FIG. 3 is a front view of the motorcycle using the navigation device according to the present invention.

Referring to FIG. 3, there is shown a front view of the motorcycle using the navigation device according to the present invention, showing a GPS antenna 34 arranged on the front of the vehicle body, right and left fog lamps 35, 35 arranged on the lower sides of the vehicle body, head lights 18, 18 arranged on the fairing 17, right and left mirrors 19, 19 arranged on the fairing 17, right and left front winkers 36, 36 integrally incorporated into these mirrors 19, 19, respectively, and right and left air openings 38, 38 provided on the fairing 17.

The GPS antenna 34 is preferably a chip antenna, a batch antenna, or a helical antenna that can be incorporated into a meter panel (instrument panel) 57 or into the fairing 17.

Figure 4:
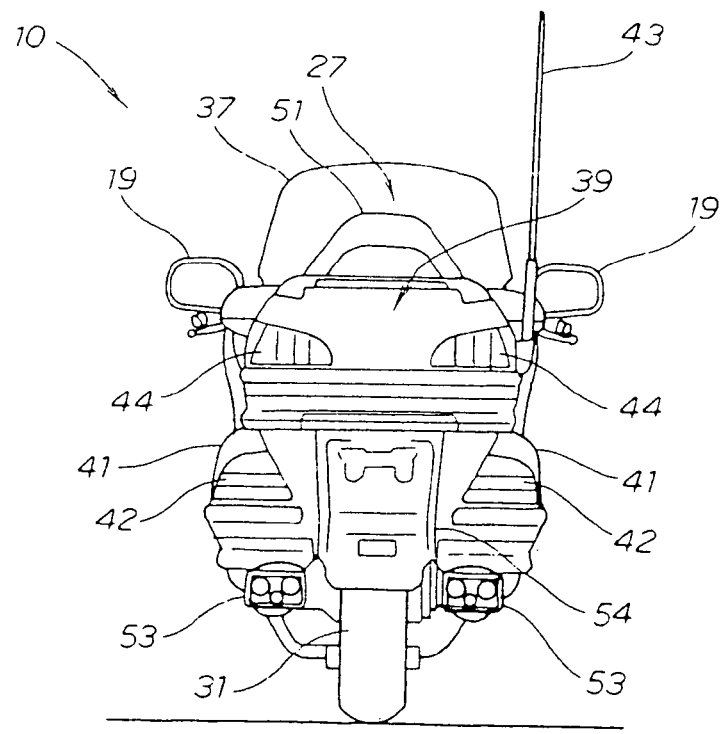
FIG. 4 is a rear view of the motorcycle using the navigation device according to the present invention.

Referring to FIG. 4, there is shown a rear view of the motorcycle using the navigation device according to the present invention, showing a trunk box 39 arranged in the center of the rear of the vehicle body, right and left saddlebags 41, 41 arranged on both sides of the trunk box 39, right and left rear winkers 42, 42 arranged on the back of the right and left saddlebags 41, 41, a rod antenna 43 arranged on the right of the trunk box 39, right and left tail lamps 44, 44 arranged on the back of the trunk box 39, right and left mufflers 53, 53 arranged in the lower portion of the vehicle body, and a rear wheel 31 covered with a rear fender 54.

Figure 5:
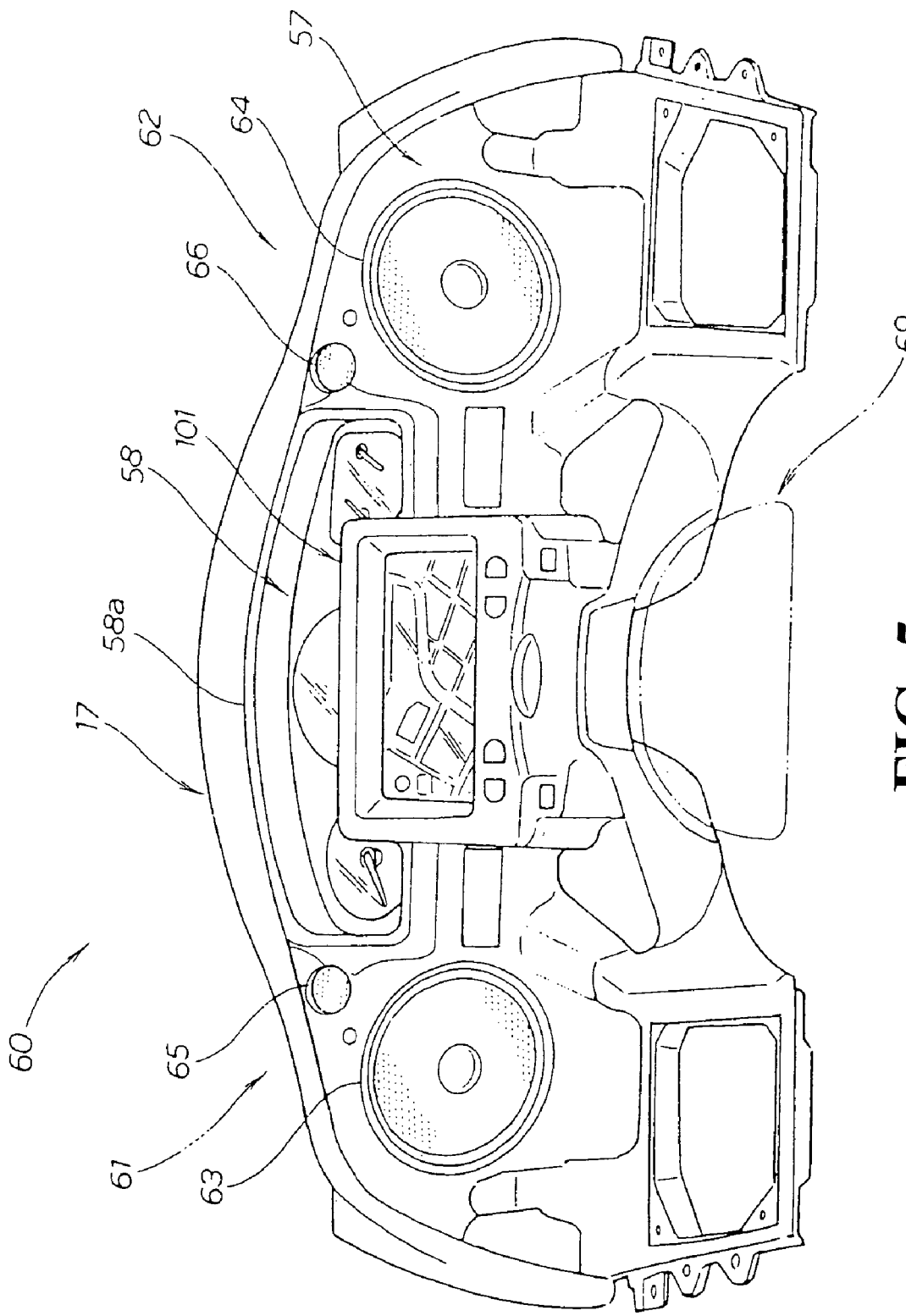
FIG. 5 is a perspective view of an acoustic system of the motorcycle using the navigation device according to the present invention.

Referring to FIG. 5, there is shown a perspective view of an acoustic system of the motorcycle using the navigation device according to the present invention. In the motorcycle 10 (See FIG. 1) provided with the meter indicating section 58 for showing driving information such as a vehicle speed or a travel distance in front of a driver and provided with left and right speakers (speaker systems) 61, 62 for generating reproduced sounds of English conversation, music or the like in both sides of the meter indicating section 58, the acoustic system 60 comprises the left speaker (speaker system) 61 including a left midrange/bass unit (midrange/bass speaker) 63 for reproducing midrange and bass sounds with the left speaker (speaker system) 61 arranged to the left of the meter indicating section 58 and a left treble unit (treble speaker) 65 for reproducing treble sounds arranged between the meter indicating section 58 and the left midrange/bass unit 63 and the right speaker (speaker system) 62 including a right midrange/bass unit 64 for reproducing midrange and bass sounds with the right speaker (speaker system) 62 arranged to the right of the meter indicating section 58 and a right treble unit 66 for reproducing treble sounds arranged between the meter indicating section 58 and the right midrange/bass unit 64. As shown in FIG. 2, the left speaker 61 has a left deep bass unit 67 inside the trunk box 39 and the right speaker 62 has a right deep bass unit 68 inside the trunk box 39.

The meter panel (instrument panel) 57 is a panel where the left and right midrange/bass units 63, 64 and the treble units 65, 66 can be arranged and where the meter indicating section 58 and the navigation display section 101 are arranged.

The left and right midrange/bass units 63, 64 may be provided with a net (saran net) for protecting the midrange/bass units 63, 64.

Figure 6:
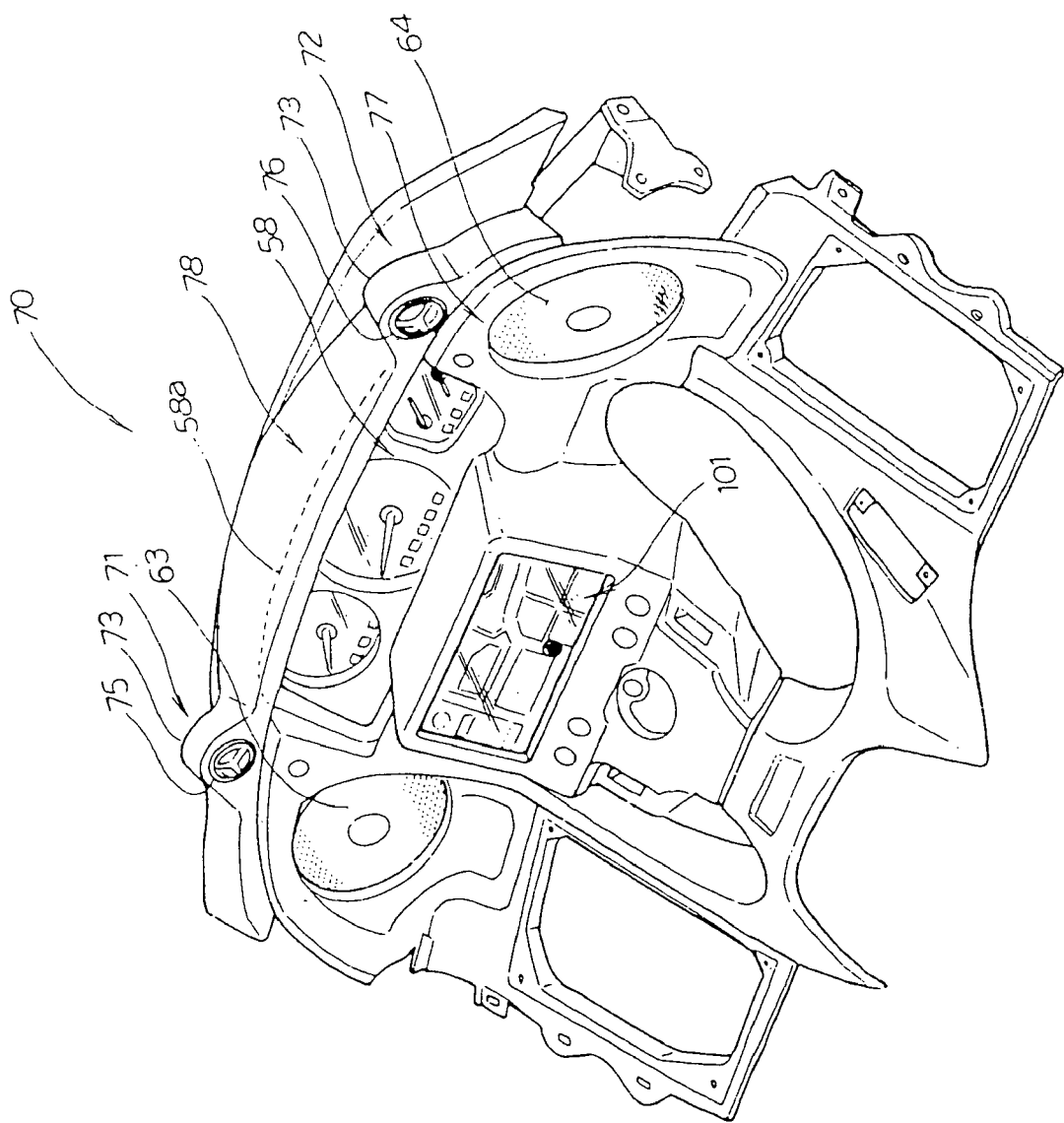
FIG. 6 is a perspective view of an acoustic system in another embodiment of the motorcycle using the navigation device according to the present invention.

Referring to FIG. 6, there is shown a perspective view of an acoustic system in another embodiment of the motorcycle using the navigation device according to the present invention. The same reference numerals have been used as in the acoustic system 60 for the same parts and their detailed description is omitted here.

An acoustic system 70 comprises left and right midrange/bass units (midrange/bass speakers) 63, 64 arranged on both sides of a meter indicating section 58, a dashboard 78 arranged on top of a meter panel (instrument panel) 77, cover members (speaker boxes) 73, 73 provided integrally with the dashboard 78 on both sides of the top surface thereof, and left and right treble units (treble speakers) 75, 76 arranged in the cover members 73, 73 via a baffle (not shown).

The cover member 73, the baffle (not shown), and the treble unit 75 constitute the left treble speaker assembly 71. The cover member 73, the baffle, and the treble unit 76 constitute the right treble speaker assembly 72.

The acoustic system 70 has the left and right treble units 75, 76 arranged so as to protrude upward of the vehicle body from an upper edge line 58a of the external form of the meter indicating section 58 with the sides and the bottoms of the left and right treble units 75, 76 covered with the cover members 73, 73. This enhances the presence of the left and right treble units 75, 76, which enables a representation of a sense of quality of the acoustic system 70.

The following sections provide information on the navigation device 100.

Figure 7:
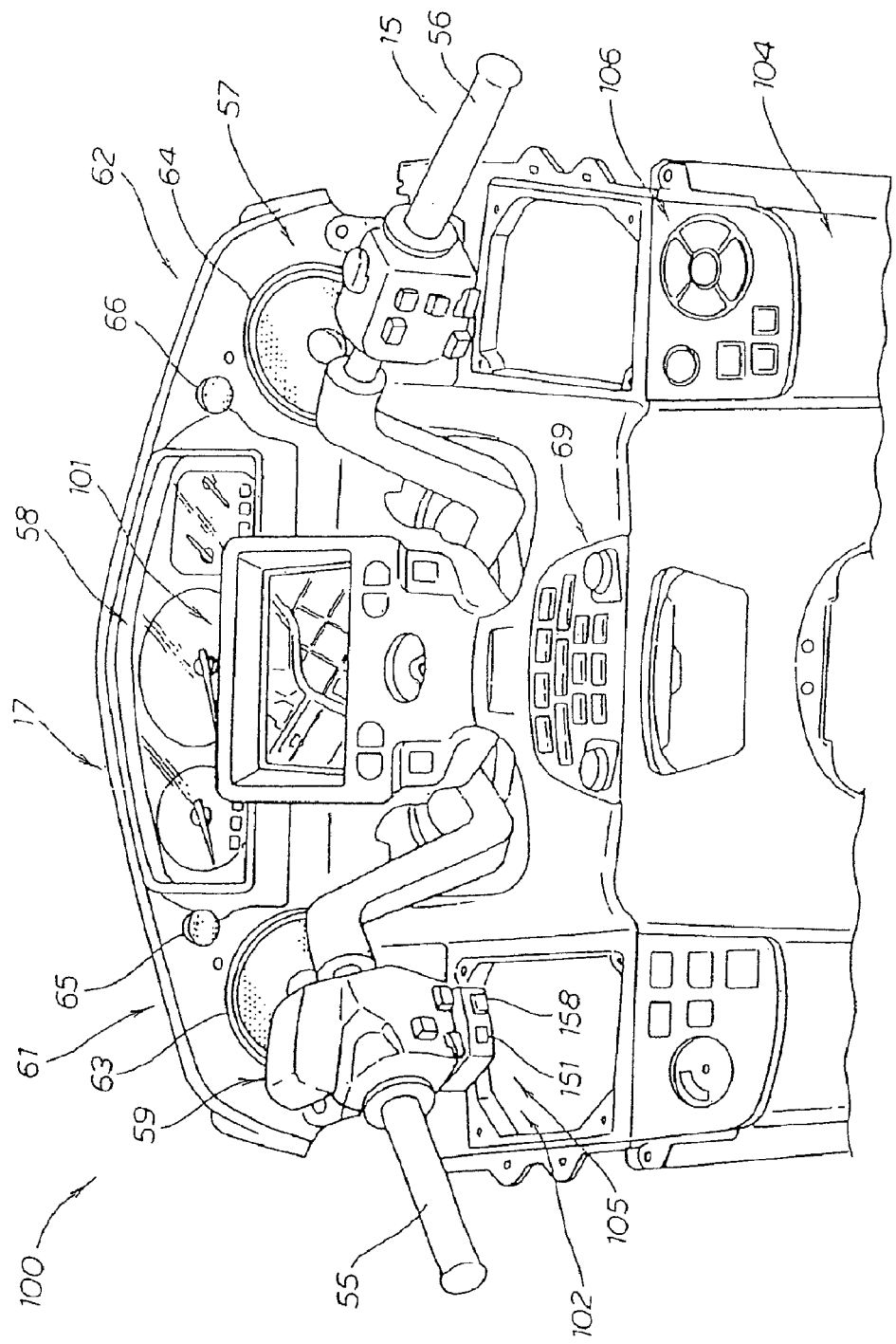
FIG. 7 is a perspective view of the motorcycle navigation device according to the present invention.

Referring to FIG. 7, there is shown a perspective view of the motorcycle navigation device according to the present invention. The navigation device 100 has a navigation display section 101 arranged at the back of the meter indicating section 58, the operating section 102 divided and arranged in the handle switch box 59 to the left of the steering handle 15 and the cowl 104, and the control unit 103 (See FIG. 2) housed in the trunk box 39.

The operating section 102 has a divided construction composed of a first operating section 105 and a second operating section 106. The first operating section 105 is provided in the handle switch box 59 so as to be operable during driving and the second operating section 106 is attached to the cowl 104 so as to be operated during parking.

In the navigation device 100, the first operating section 105 is provided in the vicinity of the left handle grip 55, whereby a driver can operate the navigation device 100 without taking either hand off the steering handle 15 during driving. As a result, the operation of the navigation device 100 can be improved.

Furthermore, in the navigation device 100, the second operating section 106 is provided under the right handle grip 56 and in the inside of the cowl 104 covering the vehicle body 11 (See FIG. 1). Therefore, the driver can make various settings of the navigation device 100 while sitting astride the vehicle seat 27 (See FIG. 1) during parking. As a result, the usability of the navigation device 100 can be improved.

Figure 8:
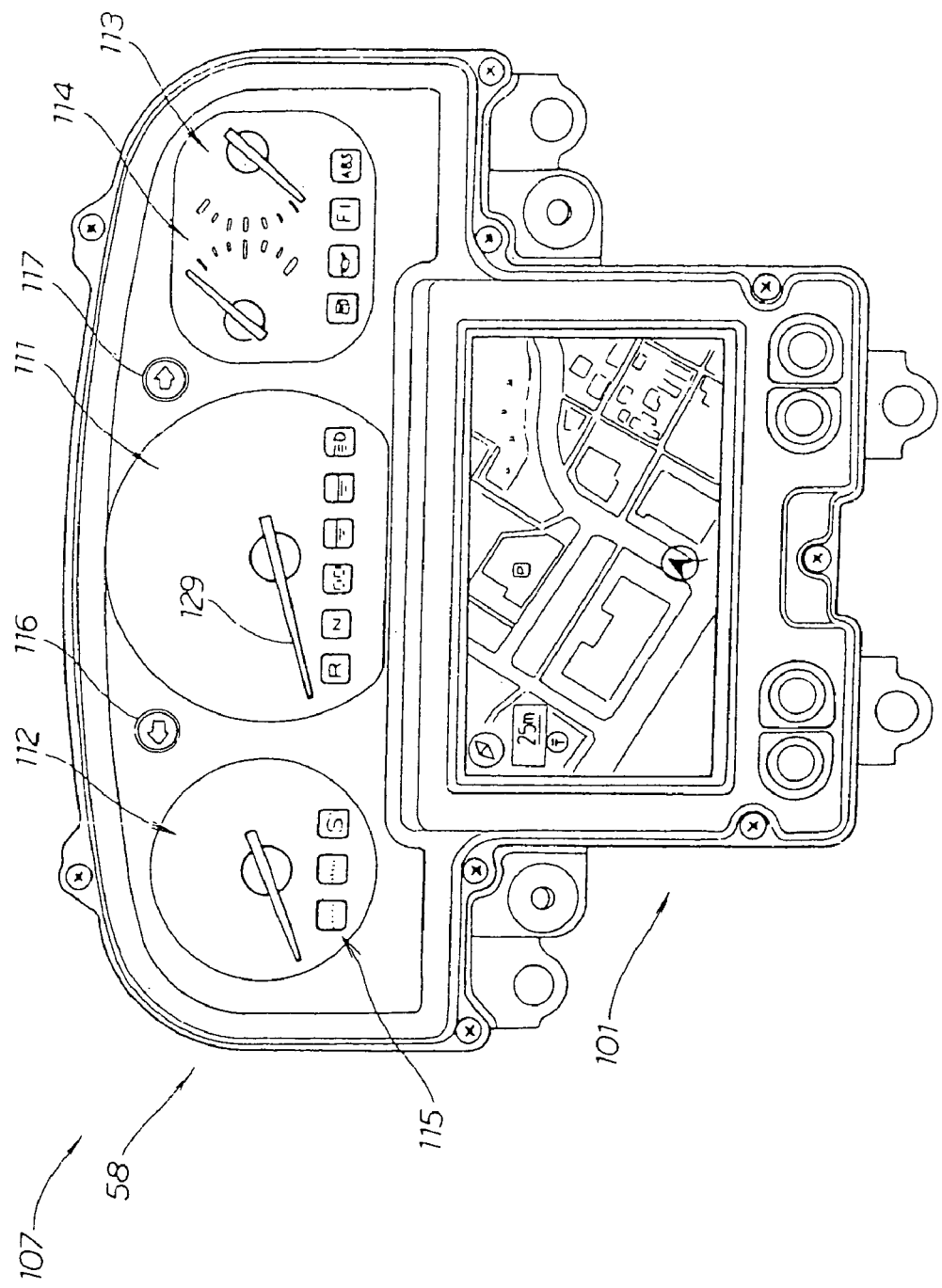
FIG. 8 is a front view of a meter indicating section and a navigation display section of the motorcycle navigation device according to the present invention.

Referring to FIG. 8, there is shown a front view of the meter indicating section and the navigation display section of the motorcycle navigation device according to the present invention. The meter indicating section (vehicle meter) 58 shows a speed meter 111 for indicating a vehicle speed, a tachometer 112 for indicating an engine speed, a water temperature gauge 113 for indicating the temperature of cooling water, a fuel indicator 114 for indicating a residual quantity of fuel, warning marks or the like 115 for giving a warning or for calling the driver's attention, and left and right winker marks 116, 117 indicating the lighting condition of the winkers.

The navigation display section 101 displays navigation information such as a destination or the current vehicle position and further displays warning information for giving an alarm or for calling the driver's attention or displays audio information of the component 69 (See FIG. 7).

Figure 9:
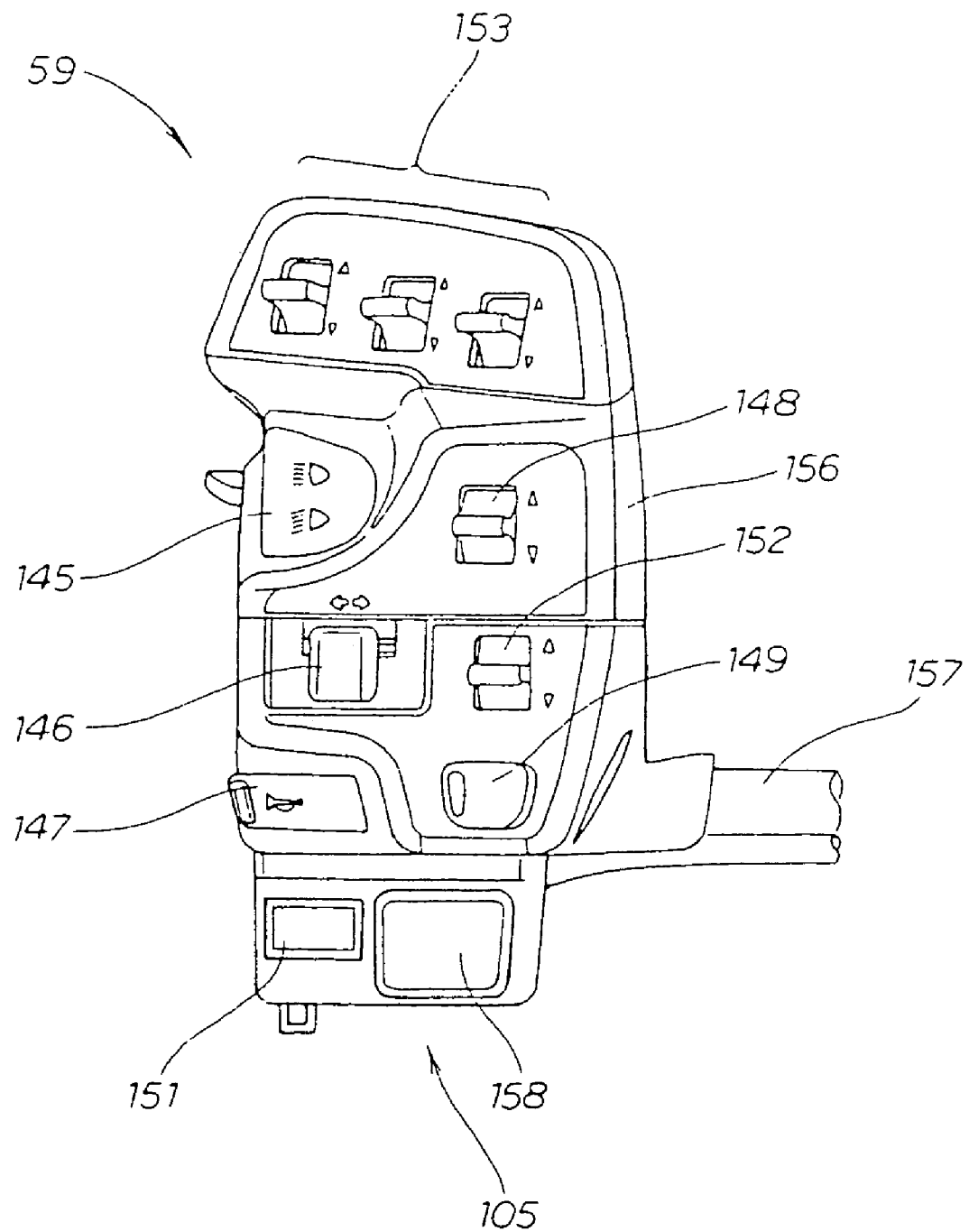
FIG. 9 is a front view of a handle switch box of the motorcycle using the navigation device according to the present invention.

Referring to FIG. 9, there is shown a front view of a handle switch box of the motorcycle using the navigation device according to the present invention. The handle switch box 59 is an operating part where there are arranged operation buttons or a control lever operated during driving and is a box where there are arranged light operation buttons 145 for turning on headlights 18, 18 (See FIG. 3), tail lamps 44, 44 (See FIG. 4) or the like, a winker slide control 146 for controlling right and left front winkers 36, 36 (See FIG. 3) and right and left rear winkers 42, 42 (See FIG. 4), a horn switch button 147 for honking a horn (not shown), a volume lever 148 enabling a volume control of the component 69 (See FIG. 7) or the navigation device 100, a mute button 149 for temporarily lowering the volume of the component 69 or the navigation device 100, a tuning/disk button 152 for selecting a broadcasting station in the component 69 or selecting a track number of a disk such as a CD, an amateur radio lever and the like 153 for controlling an amateur radio (not shown), and the first operating section 105 of the operating section 102 for the navigation device 100 (See FIG. 7).

The first operating section 105 includes a changeover switch 158 for changing over to the voice input enabled condition of voice input means 200 (described in detail with reference to FIG. 12) as specific input means and an operating switch 151 as a zooming switch for controlling the navigation device 100 (See FIG. 7) during driving, a voice re-guide switch, and a screen changeover switch.

The changeover switch 158 has a setting system of moving from the voice input enabled condition (voice input ON) to the voice input OFF or back again whenever it is pressed once, for example.

The operating switch 151 is capable of a combined control. The switch can be used to zoom in a map (a detailed screen) by declining it to the left, to zoom out a map (a wide-area screen) by declining it to the right, to repeat a voice guide (re-guide or re-announcement) by pushing it forward, to change a map screen to a guide screen by pushing and holding the center (long push), and to resume the map screen by pushing and holding it again.

In other words, it can be said that the operating switch 151 is a combined-controllable switch having the zooming switch function, the voice re-guide switch function, and the screen changeover switch function. Hereby, the operation functions can be concentrated, thereby improving the operability of the navigation device 199 (See FIG. 7) during driving.

Figure 13A:
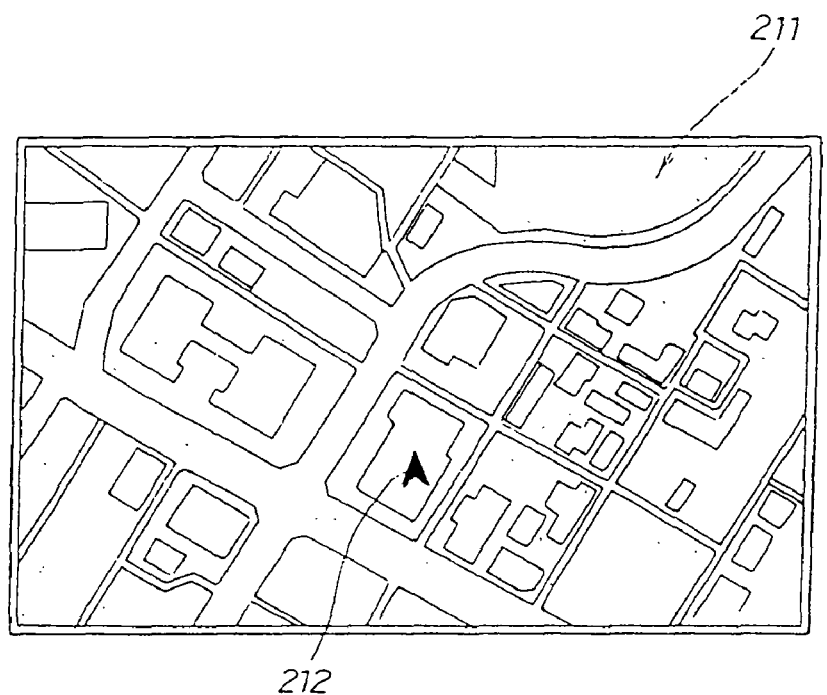
FIGS. 13(a) and (b) are display screens showing examples of the navigation display section of the motorcycle navigation device according to the present invention.
Figure 13B:
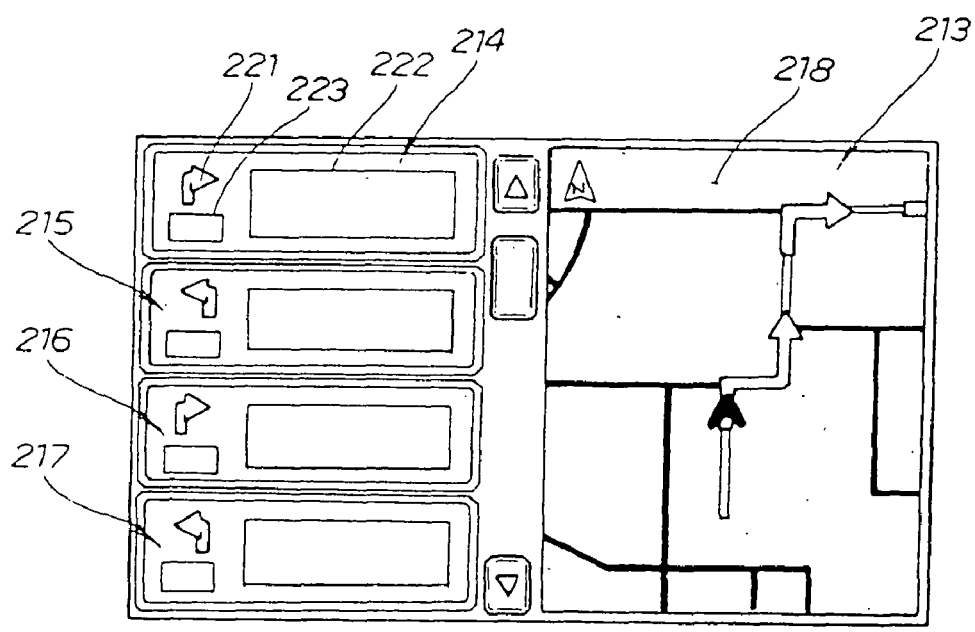

Note here that the voice guide (function) is for use in announcing in voice that the motorcycle has come close to a railroad crossing or in announcing in voice that the motorcycle has come close to a destination, that the map screen consists predominantly of a road map as shown in FIG. 13(a), and that the guide screen shows a display of a guide (directions) without use of a road map as shown in FIG. 13(b).

In the diagram, a reference numeral 156 designates a switch housing and a reference numeral 157 designates a cable extending from the switch housing 156.

More specifically, the first operating section 105 is provided with an operating switch (zooming switch) 151 for zooming in or out the map screen displayed on the navigation display section 101 (See FIG. 7), whereby the map screen can be zoomed in or out during driving, and the first operating section 105 is provided with the operating switch (voice re-guide switch) 151 for prompting a repetition of the voice guide, whereby the driver can listen to the voice guide any number of times if he failed to catch the voice of the voice guide during driving. Hereby, it becomes possible to improve the convenience of the navigation device 100 (See FIG. 7).

In addition, the first operating section 105 is provided with an operating switch (screen changeover switch) 151 for changing the guide screen for displaying the map screen and various kinds of guide information, thereby enabling switching of the guide screen for displaying the map screen and various kinds of guide information during driving. Hereby, it becomes possible to improve the convenience of the navigation device 100 (See FIG. 7).

Figure 10:
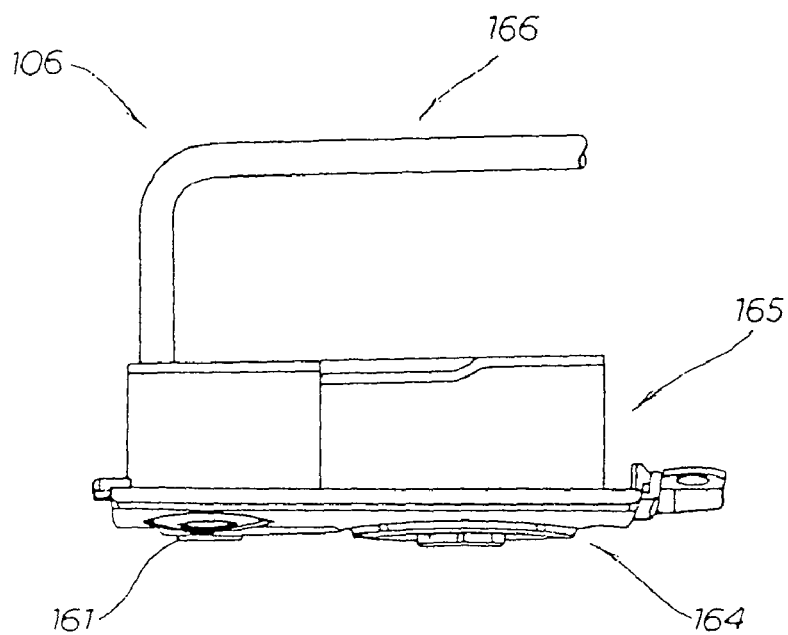
FIG. 10 is a front view of a second operating section of the motorcycle navigation device according to the present invention.
Figure 11:
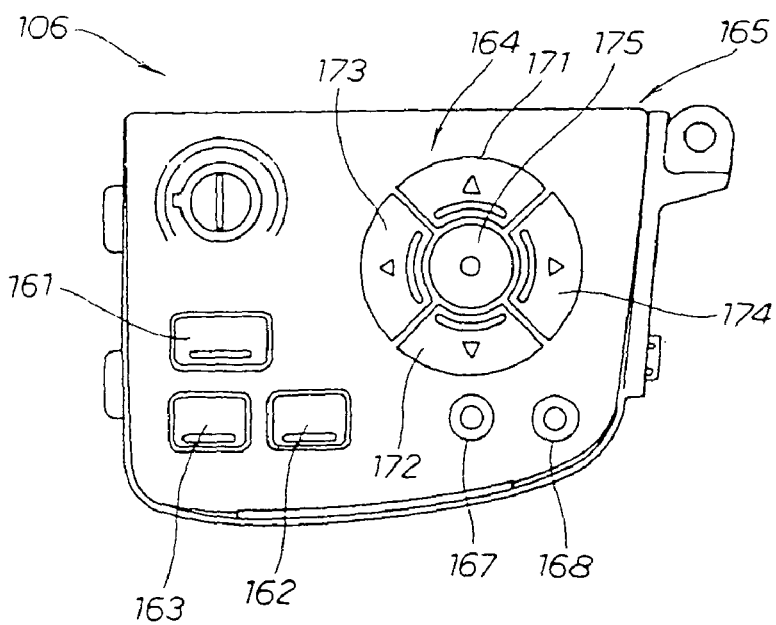
FIG. 11 is a plan view of the second operating section of the motorcycle navigation device according to the present invention.

Referring to FIG. 10, there is shown a front view of the second operating section of the motorcycle navigation device according to the present invention. Referring to FIG. 11, there is shown a plan view of the second operating section of the motorcycle navigation device according to the present invention.

Figure 12:
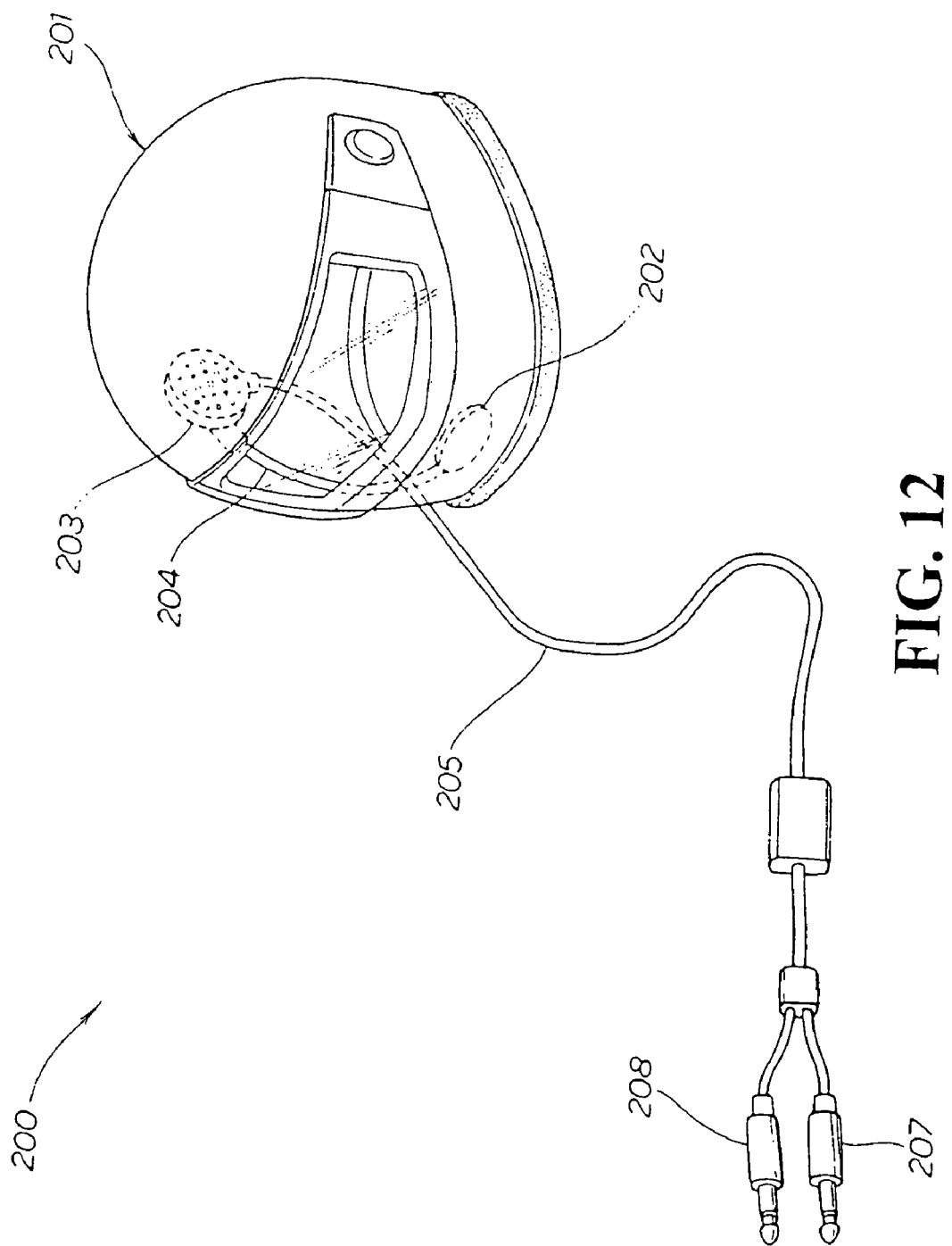
FIG. 12 is a perspective view of voice input means of the motorcycle navigation device according to the present invention.

The second operating section 106 is an operating part where there are arranged buttons operated during parking, comprising a menu button 161 for displaying various setting contents, a cancel button 162 for canceling a content selected once, a map button 163 for displaying an express highway map, an out-of-town map, or the like, a selection/determination button 164 for selecting or determining a menu or a map displayed by using the menu button 162 or the map button 163, an operation panel 165 where these buttons 161 to 164 are arranged, an operation cable 166 shown in FIG. 10 extending from the operation panel 165, and a microphone input 167 and a headphone jack 168 for connecting the voice input means 200 (See FIG. 12).

The selection/determination button 164 includes selection buttons 171 to 174 for selecting a menu or a map and a determination button 175 for determining the selected menu or map.

Referring to FIG. 12, there is shown a perspective view of the voice input means for the motorcycle navigation device according to the present invention.

The voice input means 200 is means formed inside a helmet 201 that the driver wears, including a microphone 202 for sensing driver's voice by being attached to the helmet 201, a head receiver 203 for transmitting the contents of the voice guide to the driver by being attached to the helmet 201, a connection cable 204 for connecting the microphone 202 to the head receiver 203, an extension cable 205 extended from the head receiver 203, and a microphone input 207 and a headphone jack 208 connected at the distal end of the extension cable 205.

Referring to FIGS. 13(*a*), (*b*), there are shown examples of display screens of the navigation display section of the motorcycle navigation device according to the present invention.

In FIG. 13(*a*), there is shown an example of the map screen. The map screen 211 consists predominantly of a road map, wherein the map display is zoomed in (detailed screen) by depressing the left end of the operating switch 151 (See FIG. 9), and zoomed out (wide-area screen) by depressing the right end thereof.

In addition, the map screen 211 displays a pointer (indicator) 212 and the pointer 212 indicates the direction in which the motorcycle 10 (See FIG. 1) is driving and the position thereof.

In FIG. 13(*b*), there is shown an example of the guide screen. The guide screen 213 shows directions without use of a road map and is displayed by pushing and holding the center of the operating switch 151 (See FIG. 9) so as to achieve changeover from the map screen 211 shown in (a) to the guide screen 213.

The guide screen 213 is composed of the first to fourth turn displays 214 to 217 for showing a right-turn or left-turn point by being displayed on the left of the screen and a route display 218 for guiding the motorcycle 10 into a driving route by being displayed on the right of the screen.

In the diagram, reference numerals 221, 222, and 223 designate an arrow indication for indicating a right turn or a left turn, a road name indication for showing a road where the motorcycle is to take a right turn or a left turn, and an indication of a distance to the road where the motorcycle takes a right turn or a left turn, respectively.

Figure 14:
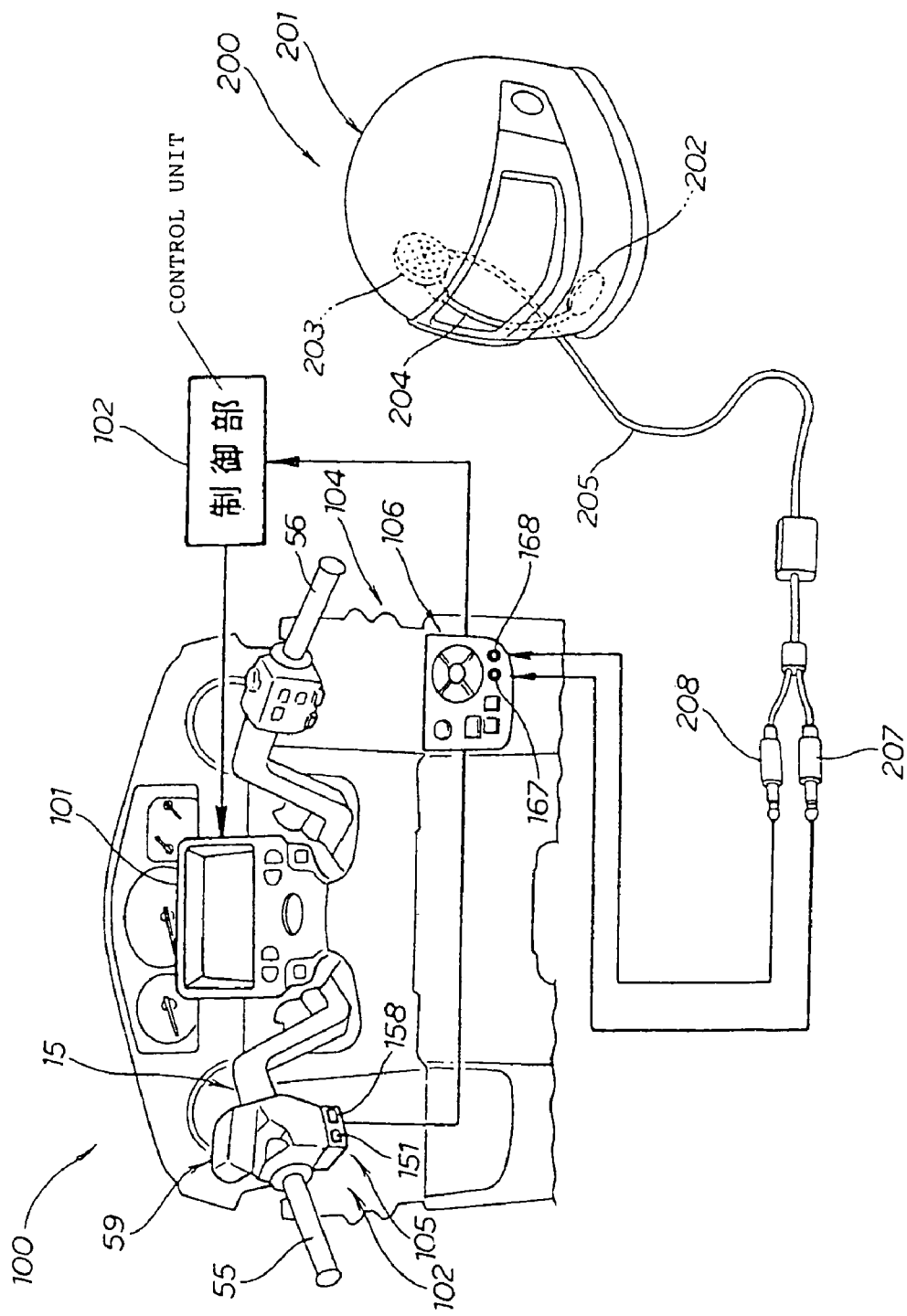
FIG. 14 is a block section of the motorcycle navigation device according to the present invention.
Figure 15:
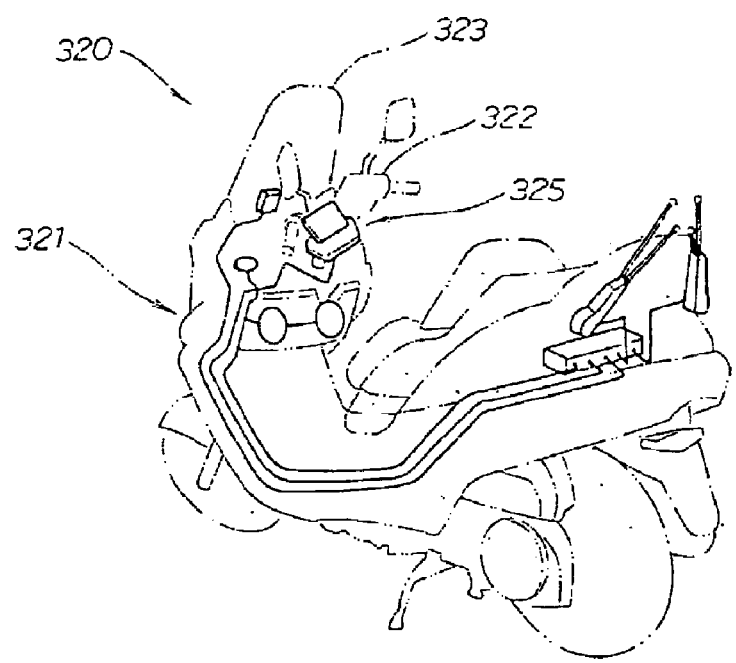
FIG. 15 is a diagram for explaining an arrangement of a conventional motorcycle navigation device.
Figure 16:
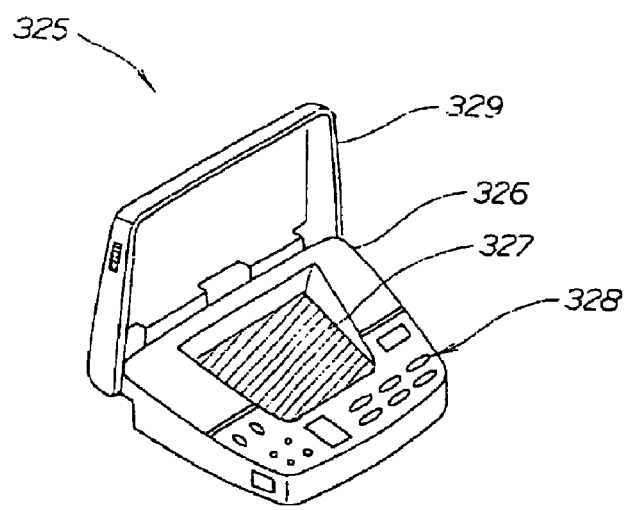
FIG. 16 is a diagram for explaining a basic configuration of the conventional motorcycle navigation device.

Referring to FIG. 14, there is shown a block section of the motorcycle navigation device according to the present invention. In the motorcycle 10 (see FIG. 1) provided with the navigation device that comprises the navigation display section 101 for displaying navigation information such as a destination and the current vehicle position, the control unit 103 for controlling the navigation display section 101, and the operating section 102 for performing an input operation to the control unit 103, it can be said that the navigation device 100 has the operating section 102 separated from the navigation display section 101 and arranged on the side of the vehicle 11 (See FIG. 1).

For example, if the driver could operate the navigation device in a comfortable position during driving, it would be possible to make the navigation device user-friendly.

Thus, the operating section 102 is separated from the navigation display section 101, thereby facilitating an arrangement of the navigation device 100.

In addition, the operating section 102 is placed on the side of the vehicle body 11 (See FIG. 1), thereby enabling an operation of the navigation device 100 in a comfortable position.

It can be said that the navigation device 100 has the operating section 102 divided into the first operating section 105 operable during driving and the second operating section 106 operated during parking and has the operating section 102 including specific input means (voice input means) 200 capable of input to the control unit 103, besides the first and second operating sections 105, 106.

With the operating section 102 divided into the first operating section 105 operable during driving and the second operating section 106 operated during parking, it becomes possible to distinguish the operations to be performed during driving clearly from those to be performed during parking. Hereby, the operability of the navigation device 100 can be improved.

In addition, the operating section 102 is provided with the specific input means (voice input means) 200 capable of input to the control unit 103, whereby the navigation device 100 can be widely used. Hereby, the convenience of the navigation device 100 can be improved.

It can also be said that the navigation device 100 has the voice input means 200 capable of input in voice as the specific input means and a changeover switch 158 for changing over to the voice input enabled condition provided in the first operating section 105.

With the voice input means 200 capable of input in voice as the specific input means, it is possible to use the navigation device 100 even if the driver cannot take either hand off the handlebar during driving, for example. Hereby, the navigation device 100 can be used more frequently.

In addition, with the provision of the changeover switch 158 for changing over to the voice input enabled condition in the first operating section 105, the input mode can be switched to the voice input during driving. Hereby, the convenience of the navigation device can be improved.

While the motorcycle navigation device according to the present invention has the voice input means 200 as the specific input means as shown in FIG. 14, the input means is not limited to this, but can be touch-panel input means capable of input to the control unit at a touch on the navigation display section, for example.

While the motorcycle navigation device according to the present invention has the first operating section 105 provided in the vicinity of the left handle grip 55, it is not limited to this, but the first operating section 105 can be provided under the left handle grip 55. In other words, it does not hinder the switch operation required during driving.

The motorcycle navigation device according to the present invention is suitable for use in a large motorcycle.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A navigation device for a motorcycle comprising:
    a navigation display section for displaying navigation information including a destination and a current position of the motorcycle, the navigation display section being disposed together with a meter indicating unit on a meter panel at a front of the motorcycle,
    a control unit for controlling the navigation display section, the control unit being disposed separately from the navigation display section at a rear portion of the motorcycle,
    an operating section which enables a rider of the motorcycle to perform an input operation to the control unit,
    wherein meter indicating unit, the navigation display section, and the control unit are arranged in fixed positions from front to rear along a longitudinal centerline of a body of the motorcycle, and the operating section is disposed separately from the navigation display section in a fixed position on at least one of two lateral sides of the body of the motorcycle, and
    wherein the positions of the navigation display section and the operating section improve operability and convenience of the navigation device for the rider, both when the motorcycle is traveling and when the motorcycle is parked.

2. The navigation device for a motorcycle according to claim 1, wherein:
    the operating section is divided into a first operating section operable during driving and a second operating section operated during parking; and
    the operating section further includes specific input means capable of input to the control unit besides the first and second operating sections.

3. The navigation device for a motorcycle according to claim 2, wherein the specific input means is voice input means capable of input in voice and the first operating section is provided with a changeover switch for changing over to a voice input enabled condition achieved by the voice input means,
    wherein the changeover switch includes a setting system adapted to move from a voice input enabled condition (voice input ON) to a voice input OFF or back again whenever it is pressed once.

4. The navigation device for a motorcycle according to claim 2, wherein the first operating section is provided with one or both of a zooming switch for zooming in or out a map screen displayed on the navigation display section and a voice re-guide switch for prompting a repetition of a voice guide.

5. The navigation device for a motorcycle according to claim 2, wherein the first operating section is provided with a screen changeover switch for changing a guide screen for displaying the map screen and various kinds of guide information.

6. The navigation device for a motorcycle according to claim 2, wherein the first operating section is disposed in a vicinity of a left handle grip.

7. The navigation device for a motorcycle according to claim 2, wherein the second operating section is disposed under a right handle grip and inside a cowl of the motorcycle,
    wherein the cowl is adapted to cover the body of the motorcycle.

8. The navigation device for a motorcycle according to claim 2, wherein the first operating section is disposed under a handle switch.

9. The navigation device for a motorcycle according to claim 2, wherein the control unit is mounted in a trunk box in a position that is under a back rest of a passenger seat.

10. The navigation device for a motorcycle according to claim 1, wherein the operating section includes a first operating section provided with one or both of a zooming switch for zooming in or out a map screen displayed on the navigation display section and a voice re-guide switch for prompting a repetition of a voice guide.

11. The navigation device for a motorcycle according to claim 1, wherein the operating section includes a first operating section provided with a screen changeover switch for changing a guide screen for displaying the map screen and various kinds of guide information.

12. The navigation device for a motorcycle according to claim 1, wherein the operating section includes a combined-controllable switch having a zooming switch function adapted to zoom in a map (a detailed screen) by declining the switch to left, to zoom out a map (a wide-area screen) by declining the switch to right, a voice re-guide switch function activated by pushing the switch to forward, and a screen changeover switch function adapted to change a map screen to a guide screen by pushing and holding a center of the switch (long push), and to resume the map screen by pushing and holding the switch again.

13. The navigation device for a motorcycle according to claim 1, wherein the operating section includes voice input means capable of input in voice, the voice input means being disposed in a helmet worn by a rider.

14. The navigation device for a motorcycle according to claim 1, wherein the control unit is mounted in a trunk box under a back rest of a passenger seat.

15. The navigation device for a motorcycle according to claim 1, wherein a handlebar of the motorcycle extends upwardly and rearwardly from the top bridge, so that left and right sections of the handlebar penetrate, respectively, through the meter panel at locations that are left and right with respect to where the navigation display section is mounted.

16. The navigation device for a motorcycle according to claim 1,
    wherein right and left sections of a handlebar extend upwardly and rearwardly from right and left sides of a top bridge, and when the handlebar is not turned to one side or another, the navigation display device is disposed in front of substantially all parts of the handlebar when the handlebar is not turned.

17. The navigation device for a motorcycle according to claim 1, when viewed in side view, an upper-most part of the navigation display device and upper-most parts of a handlebar are disposed at substantially the same height.

18. A navigation device for a motorcycle comprising:
a navigation display section for displaying navigation information including a destination and current position of the motorcycle, the navigation display section being disposed together with a meter indicating unit at a front of the motorcycle,
a control unit for controlling the navigation display section, and
an operating section which enables a rider of the motorcycle to perform an input operation to the control unit, wherein, the navigation display section, the control unit, and one portion of the operating section are disposed in separate positions on a body of the motorcycle, and
wherein meter indicating unit, the navigation display section, and the control unit are arranged in fixed positions from front to rear along a longitudinal centerline of a body of the motorcycle, and the one portion of the operating section is disposed at a fixed position on at least one of two lateral sides of the body of the motorcycle, and
wherein the positions of the navigation display section and the operating section improve operability and convenience of the navigation device for the rider, both when the motorcycle is traveling and when the motorcycle is parked.

19. The navigation device for a motorcycle according to claim 18, wherein:
the operating section is divided into a first operating section operable during driving and a second operating section, which is the one portion of the operating section, operated during parking; and
the operating section further includes specific input means capable of input to the control unit besides the first and second operating sections.

20. The navigation device for a motorcycle according to claim 19, wherein the specific input means is voice input means capable of input in voice and the first operating section is provided with a changeover switch for changing over to a voice input enabled condition achieved by the voice input means.

21. The navigation device for a motorcycle according to claim 19, wherein the first operating section is provided with one or both of a zooming switch for zooming in or out a map screen displayed on the navigation display section and a voice re-guide switch for prompting a repetition of a voice guide.

22. The navigation device for a motorcycle according to claim 19, wherein the first operating section is provided with a screen changeover switch for changing a guide screen for displaying the map screen and various kinds of guide information.

23. The navigation device for a motorcycle according to claim 19, wherein the first operating section is in a vicinity of a left handle grip, and under a handle switch.

24. The navigation device for a motorcycle according to claim 18, wherein the operating section includes a combined-controllable switch having a zooming switch function, a voice re-guide switch function, and a screen changeover switch function.

25. The navigation device for a motorcycle according to claim 18, wherein the operating section includes voice input means capable of input in voice, the voice input means being disposed in a helmet worn by a rider.

* * * * *